(12) United States Patent
Stowers (10) Patent No.: US 7,717,663 B1
(45) Date of Patent: May 18, 2010

(54) LIFT MECHANISM FOR UTILITY VEHICLES

(75) Inventor: Thomas R. Stowers, Troy, MI (US)

(73) Assignee: Creative Controls, Inc., Troy, MI (US)

( * ) Notice: Subject to any disclaimer, the term of this patent is extended or adjusted under 35 U.S.C. 154(b) by 1073 days.

(21) Appl. No.: 11/117,194

(22) Filed: Apr. 28, 2005

(51) Int. Cl.
*B66C 23/36* (2006.01)

(52) U.S. Cl. ...................................... 414/550; 414/921

(58) Field of Classification Search ................. 414/550, 414/921; 212/179, 280; 403/348
See application file for complete search history.

(56) References Cited

U.S. PATENT DOCUMENTS

| | | | | |
|---|---|---|---|---|
| 1,027,481 | A * | 5/1912 | Huff ......................... | 294/82.27 |
| 2,947,425 | A * | 8/1960 | Nichols ..................... | 414/541 |
| 3,774,788 | A * | 11/1973 | Sowers et al. .............. | 414/543 |
| 4,121,695 | A | 10/1978 | Carpenter .................. | 187/9 R |
| 4,124,100 | A | 11/1978 | Hawks ....................... | 187/9 R |
| 4,463,858 | A * | 8/1984 | Bilas ........................ | 212/176 |
| 4,556,358 | A * | 12/1985 | Harlan ...................... | 414/550 |
| 4,573,854 | A | 3/1986 | McFarland ................. | 414/462 |
| 4,593,883 | A * | 6/1986 | Nelson ....................... | 254/7 B |
| 5,180,275 | A | 1/1993 | Czech et al. ............... | 414/541 |
| 5,205,700 | A * | 4/1993 | Lin et al. ................... | 414/540 |
| 5,261,779 | A | 11/1993 | Goodrich .................... | 414/546 |
| 5,271,707 | A | 12/1993 | Derksen et al. ............. | 414/680 |
| 5,431,526 | A * | 7/1995 | Peterson et al. ............. | 414/543 |
| 5,730,304 | A * | 3/1998 | Duncan ...................... | 212/180 |
| 6,007,289 | A | 12/1999 | Kruse et al. ................. | 414/462 |
| 6,238,169 | B1 | 5/2001 | Dupuy et al. ............... | 414/546 |
| 6,379,102 | B1 | 4/2002 | Kameda ..................... | 414/546 |
| 6,416,272 | B1 | 7/2002 | Suehiro et al. .............. | 414/546 |
| 6,464,447 | B2 | 10/2002 | Dupuy et al. ............... | 414/546 |
| 6,547,507 | B1 * | 4/2003 | Gest et al. ................... | 414/543 |
| 6,582,181 | B2 | 6/2003 | Suehiro et al. .............. | 414/812 |
| 6,585,474 | B1 | 7/2003 | Kameda ..................... | 414/546 |
| 6,881,003 | B1 * | 4/2005 | Zeller et al. ................. | 403/348 |
| 6,981,834 | B1 * | 1/2006 | Henry ........................ | 414/462 |
| 7,367,462 | B1 * | 5/2008 | McMurray et al. .......... | 212/179 |
| 2004/0028513 | A1 | 2/2004 | Reynolds .................... | 414/546 |
| 2006/0062661 | A1 * | 3/2006 | Panzarella et al. .......... | 414/542 |

* cited by examiner

*Primary Examiner*—Charles A Fox
(74) *Attorney, Agent, or Firm*—Young Basile Hanlon & MacFarlane, P.C.

(57) ABSTRACT

A powered lift mechanism for stowing and deploying scooters relative to the cargo area of a conventional SUV. The lift mechanism comprises an L-shaped box-section boom which is pivotally attached to the D-pillar on the inside of the SUV cargo area so as to leave the floor of the cargo area available. A powered linear actuator controls the angle of the boom relative to the D-pillar mounting structure to raise and lower the loaded scooter. The entire lift mechanism swings in the vehicle and permits the lift gate to be fully closed with both the lift mechanism and the scooter stored within the SUV. A releasable suspension linkage is also disclosed.

8 Claims, 9 Drawing Sheets

LIFT MECHANISM FOR UTILITY VEHICLES

FIELD OF THE INVENTION

This invention relates to mechanisms for stowing and deploying various loads including personal mobility devices such as "scooters" and wheelchairs, in and from the cargo areas of utility, sport utility and other types of vehicles.

BACKGROUND

Electrically-powered personal mobility vehicles such as "scooters" and wheelchairs are used by many persons to move from place to place in the home as well as in hospitals, grocery stores, malls and other venues with pedestrian traffic. Persons who own such vehicles often wish to transport them by way of a utility or sport utility vehicle.

The typical scooter weights approximately 300 pounds, too much for an ordinary person to lift into or out of a vehicle cargo area without mechanical assistance.

It is known to install a lift mechanism in a vehicle cargo area by means of an assembly which stands on the floor of the cargo area and deploys a lifting strap by way of a powered spool or reel. When mounted in a rear cargo area, this mechanism interferes with the use of floor-based features such as foldaway seats and stowage compartment hatches.

SUMMARY

In accordance with the present invention, a lift mechanism for various loads including scooters is adapted to be mounted within the cargo area of a primary transport vehicle. Such vehicles include SUV's, minivans, crossover vehicles, wagons and even pick-up trucks. In general, the invention comprises a side-mounted, swingable boom pivotally attachable to a mast and provided with a linear actuator which raises and lowers the boom by changing its angle relative to the mast. The side-mount arrangement frees up the cargo area floor for other uses even when the lift mechanism is in service.

The lift mechanism of the present invention is advantageously adapted for installation in vehicles having vertical structural components such as "D" pillars immediately inside the cargo area opening, but may be used with other vehicles through suitable modification; i.e., an existing vertical pillar may be reinforced or an entirely new base structure may be built and installed in the cargo area. The attachment structure includes a first component called a "mast" which receives the lifting boom and one end of a linear actuator, and a second component called a "pintle" which is securely bolted to the vehicle body either directly or via a reinforcing structure. The mast and pintle are removably and pivotally attachable to one another by, for example, pins and brackets so as to allow the boom to be selectively swung into and out of the cargo area over a sill or other threshold structure. In the preferred form, a multi-position lock is provided for holding the mast in the desired angular relationship to the pintle. Thus, the lift mechanism of the present invention leaves the floor of the cargo area available for normal use of such features as fold away seats and cargo stowage hatches.

In accordance with an illustrative embodiment of the invention, the lift mechanism comprises a substantially L-shaped rigid boom preferably having a box section or partial box section defined by spaced-apart parallel side members. The lower end of the boom is attached to the rear side pillar of the transport vehicle, just inside the rear deck opening. The opposite end of the boom is equipped with a depending structure which can collect the scooter for hoisting or lowering. In addition, the lift mechanism includes an actuator, such as an electrically driven ball-screw linear actuator, for varying the angle between the boom and the vehicle. The attachment between the boom and the side pillar is such as to allow the boom and the suspended load to swing into and out of the SUV cargo area.

In the preferred form, the present invention requires no winding or reeling mechanisms to lift or deploy the scooter or other load. Instead, the boom angles downwardly or upwardly in accordance with the selected operation of the power actuator to lift or deploy the scooter or other load. Because the boom is pivotally mounted to the side pillar of the vehicle by means of a mounting structure, which affords pivoting, the boom can readily swing into the area of the cargo area where the scooter or other load is lowered to the floor. In the preferred form, the attachment mechanism is designed with pins and brackets so as to permit the boom structure to be lifted and detached from the pillar and either removed entirely from the vehicle or placed on the floor of the cargo area as desired.

As an optional feature, a second powered actuator mechanism can be provided to vary the position of the attachment point between the upper end of the boom and the load collector. In addition, means are provided for adjusting the configuration of the boom and the relationship between the boom and the actuator mechanism to fit in various shapes and sizes of vehicles.

Another aspect of my invention is an improved suspension system connected between the boom and the load. This system comprises top and bottom blocks with spherical bearing cavities, and a linkage with a metal ball attached to the opposite ends to be removably placed into respective bearing cavities. The top block is attached to the boom and the bottom block is releasably attached to the load.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Referring to the drawings, a lift mechanism 10 is shown attached to the body structure 12 of a sport utility vehicle (SUV) 14 just inside of the rear cargo opening 16. The vehicle 14 is equipped with a horizontally hinged lift gate 18 which fits over and closes the opening 16. The SUV 14 is equipped with a bumper 20 which is separated from the floor 22 of the cargo area by way of plastic sill trim 24. The floor 22 may be equipped with storage compartment hatches 25 and/or fold-away seat mechanisms (not shown), all of which are conventional and known in the SUV design art.

The lift mechanism 10 is shown here lifting and stowing a conventional 4-wheel, electric "scooter" 82 of the type having handlebar steering. Such scooters are frequently used by people with limited ambulatory capability to move from place to place. Of course, the lift mechanism 10 can be used to hoist, stow and/or deploy many different types of loads which fit wholly or partially into the cargo area of an SUV or other transport vehicle.

Figure 4:
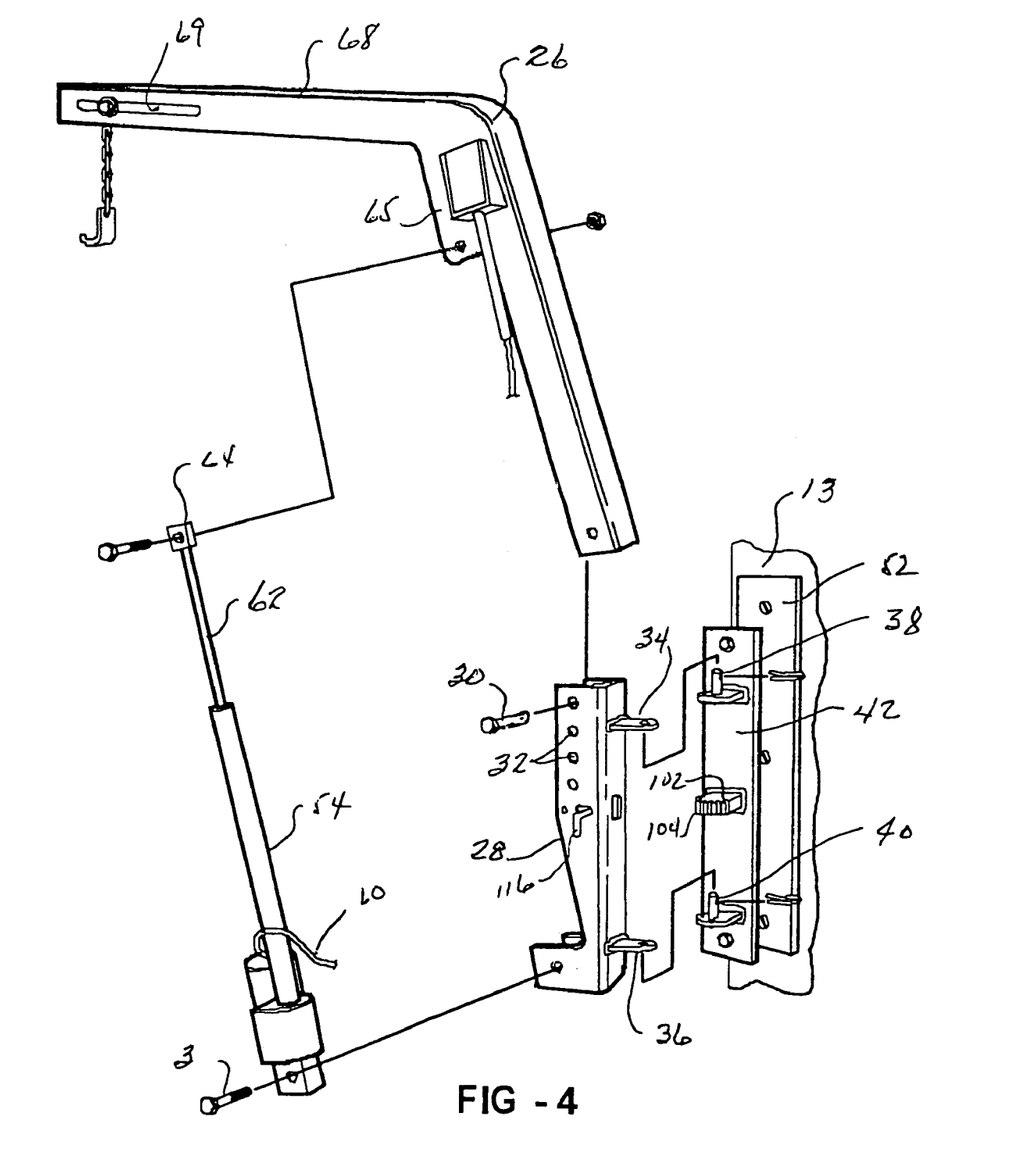
FIG. 4 is an exploded view of the lift mechanism of FIG. 1.

A typical scooter 82 is of such size to be stowable fully within the cargo compartment of the conventional full-sized SUV 14 on the floor 22 and with the lift gate 18 fully closed. The weight of a typical scooter is on the order of 300 pounds. The lift mechanism 10 comprises a substantially L-shaped rigid steel boom 26 having a three-sided, partial box section defining an interior channel. The lower end of boom 26 is pivotally attached to an elongate channel bracket hereinafter referred to as a "mast" 28. The mast 28 is also a three-sided, partial box-section element and, like boom 26, made of 1020 or 1040 steel. It's opposite parallel sides are far enough apart to allow the boom 26 to fit between them and be pinned in place, as shown in FIG. 4. The pivotal connection between boom 26 and mast 28 is provided by pin 30, which fits into any of several holes 32 provided in the mast 28, so that the lifting mechanism can be adjusted in size for any of several different vehicle designs. As best shown in FIG. 4, the mast 28 is provided with pivot pin brackets 34 and 36 which are welded to the back surface of the mast.

The attachment structure further comprises a rigid, metal pintle plate 42 which is bolted to the D pillar 13 by way of a reinforcing plate 52. It is to be understood that the reinforcing plate 52 may be customized to the particular vehicle. Typically it is an elongate plate or beam having a substantially vertical orientation relative to the body of the vehicle 14. While shown here attached to a D pillar, it may be attached to any body structure or to a custom crafted structure mounted within the vehicle. Pintle 42 has vertical pins 38 and 40 which fit into the holes in brackets 34 and 36. The pin and bracket arrangement 38, 40, 34, 36 allows the boom 26 and mast 28 to pivot or swing relative to the side of the transport vehicle 14 to stow or deploy scooter 82. A lock shown in FIG. 7 can hold the mast in any of several angular positions as hereinafter described.

To summarize, the lift mechanism comprises the rigid boom 26, a mounting structure 42, 52 attached to the vehicle body, and a mast structure 28 for pivotally attaching the boom 26 to the mounting structure 42, 52.

The lift mechanism 10 further comprises a linear actuator 54, here an electric ball-screw devise having an electric drive motor, which is connected into the electrical system of the transport vehicle 14 by way of a cable 60. A suitable switch (not shown) is preferably provided. The extension shaft 62 of the actuator 54 is connected to a flange 65 at a midpoint on the rigid boom 26 by way of a block 64 and a pin which allows pivotal movement.

Figure 1:
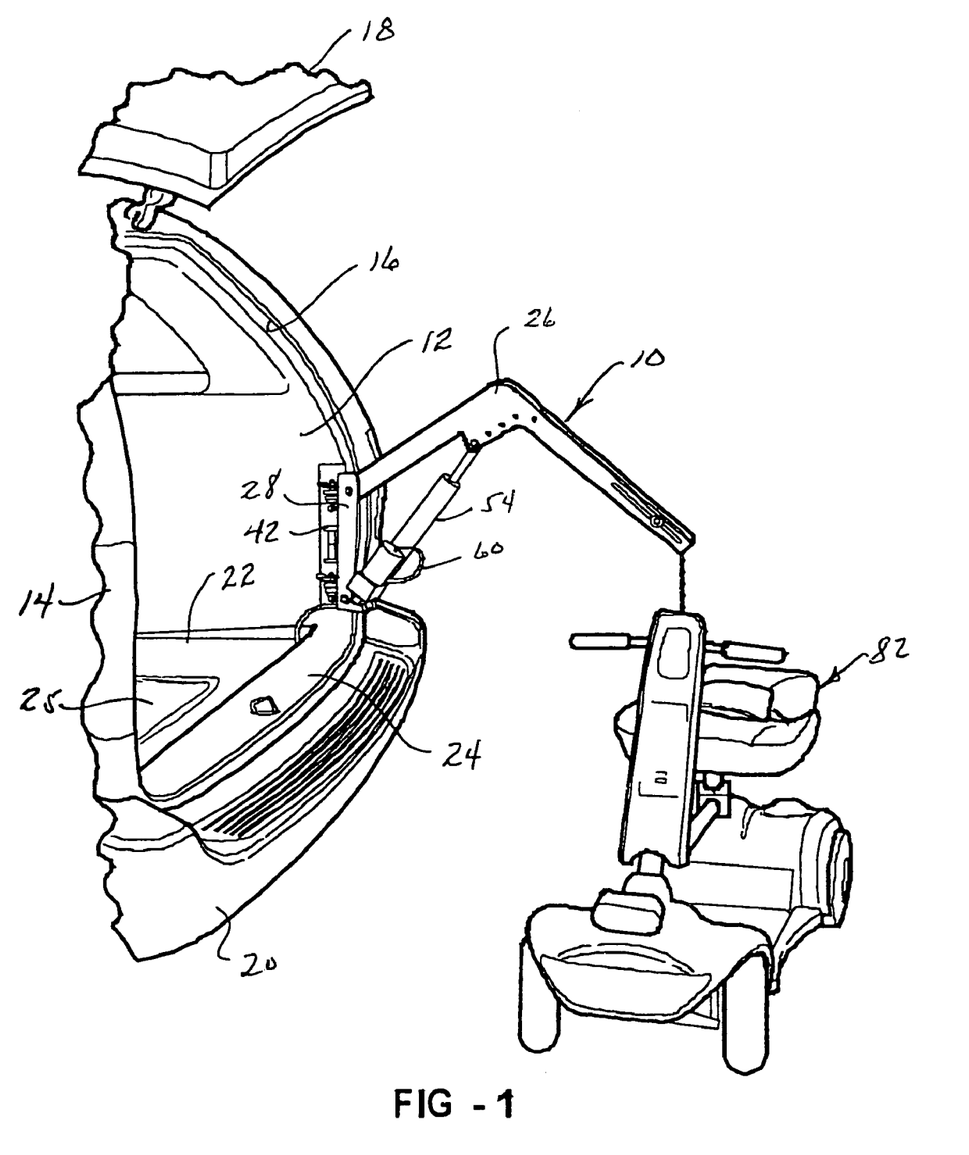
FIG. 1 is a perspective view of a lift mechanism according to the present invention attached to a scooter to be lifted into the cargo area of an SUV.
Figure 2:
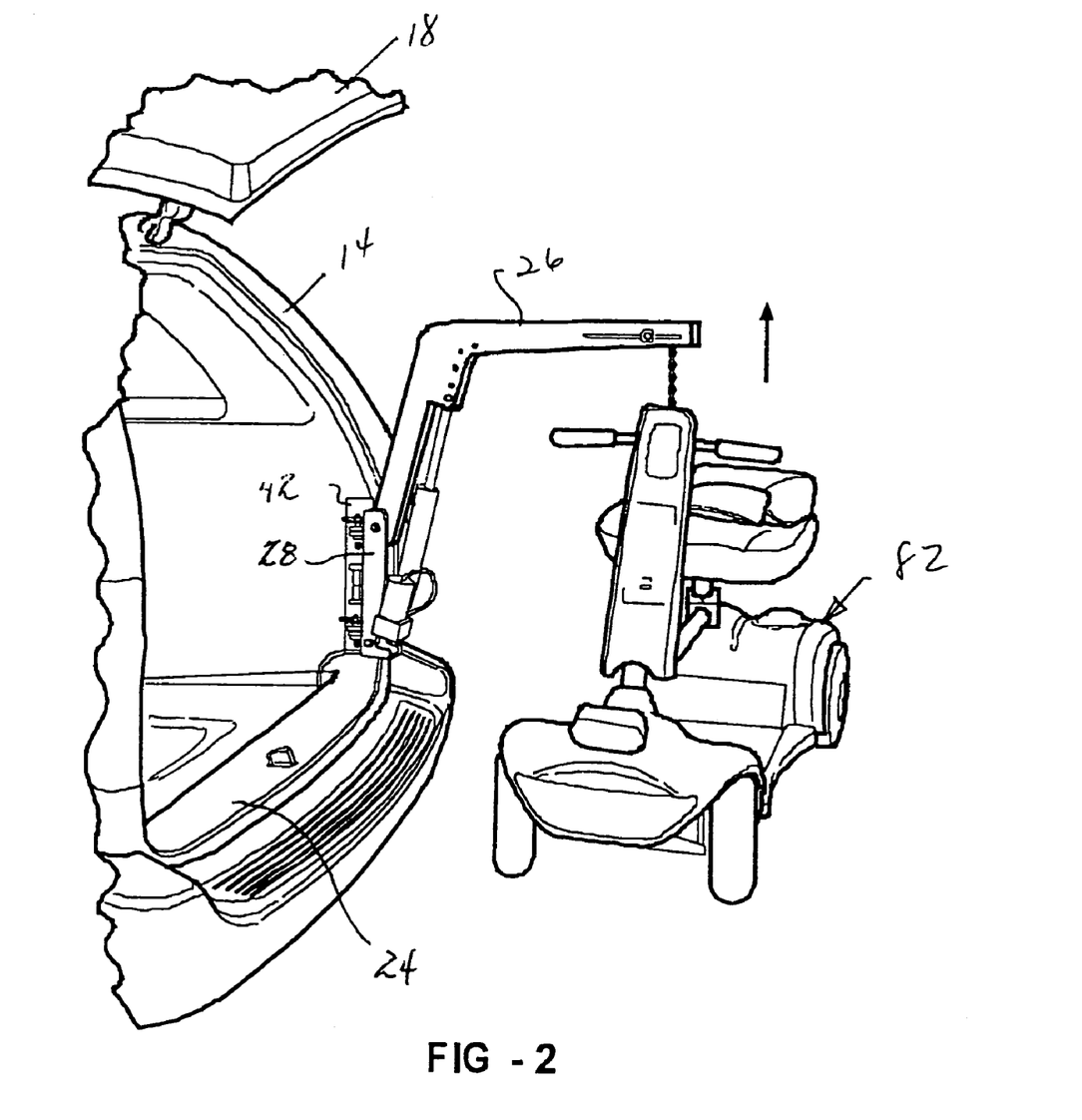
FIG. 2 is a perspective view of the lift mechanism raised to lift the load off of the ground.
Figure 3:
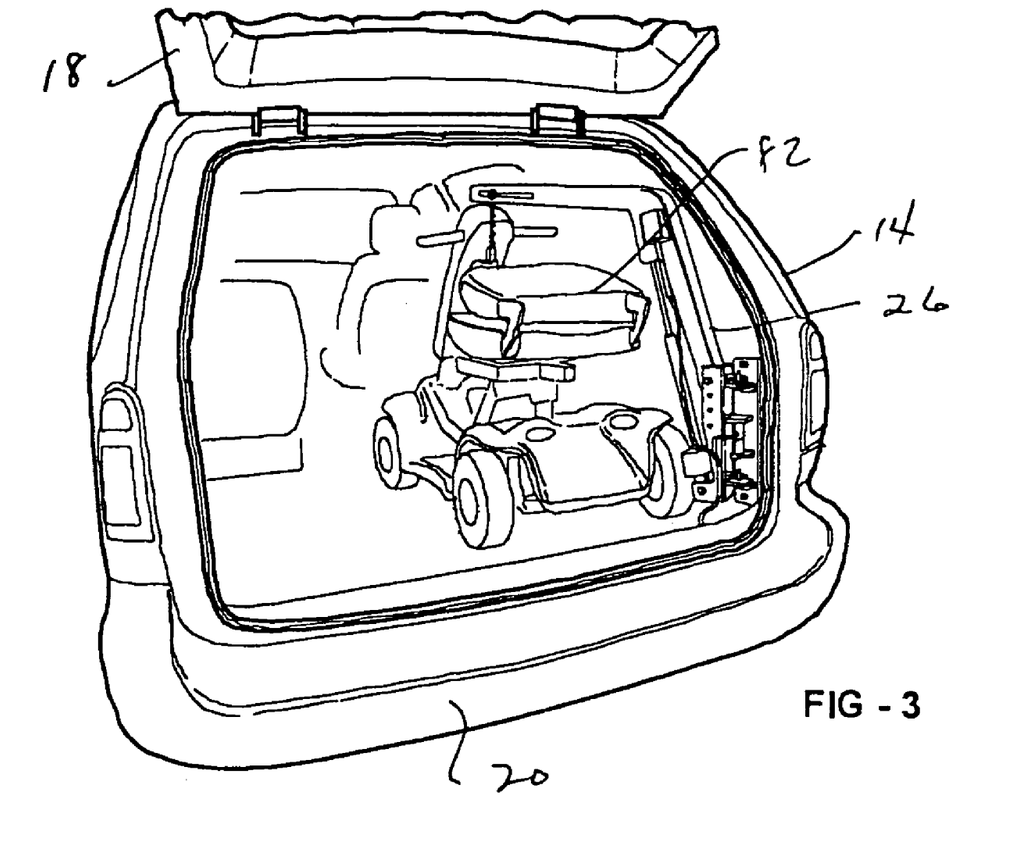
FIG. 3 shows the lift mechanism swung into the cargo area of the SUV.

The free end of the boom 26 is provided with parallel slots 69 and receives a slide block 70 which can be adjusted and locked at any desired point along the length of the slots 69 by suitable threaded fasteners. A release mechanism 72 depends from the slide block 70 as hereinafter described with reference to FIG. 6 to collect and lift the scooter 82 at an attachment point which is at or near the load's center of gravity. The length of the upper arm 68 of the boom 26 is such as to permit the mechanism 10 to be pivoted downwardly to either deploy or collect the scooter 82. Assuming the scooter 82 is being collected for stowage, the electric ball-screw actuator 54 is thereafter operated to raise the boom 26 to the position shown in FIG. 2 so that the scooter 82 is lifted up off of the ground to a point which places the wheels just above the level of the bumper 20 and the sill 24. Thereafter, the lifting mechanism with the scooter depending therefrom is swung into the cargo area of the SUV 14 as shown in FIG. 3. At this point, the lifting mechanism 26 is preferably locked in place and the lift gate 18 is closed.

Figure 5:
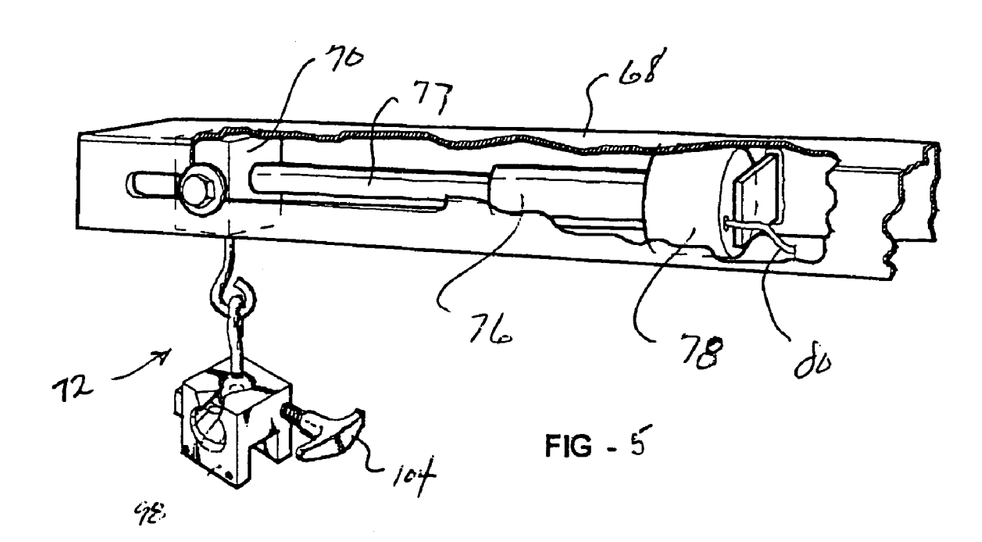
FIG. 5 is a detail of the optional power adjustment mechanism in the upper end of the boom.

Looking now to FIG. 5, an optional and/or alternative mechanism to provide a power assist for adjustment of the position of the slide block 70 along the upper arm 68 is shown. The mechanism includes another electric ball-screw linear actuator 76 having a drive motor 78 receiving DC power through a cable 80. The actuator 76 has an extension rod 77 which is attached to the slide block 70 to push it out or pull it back along the slots 69 in the upper arm 68.

Figure 6:
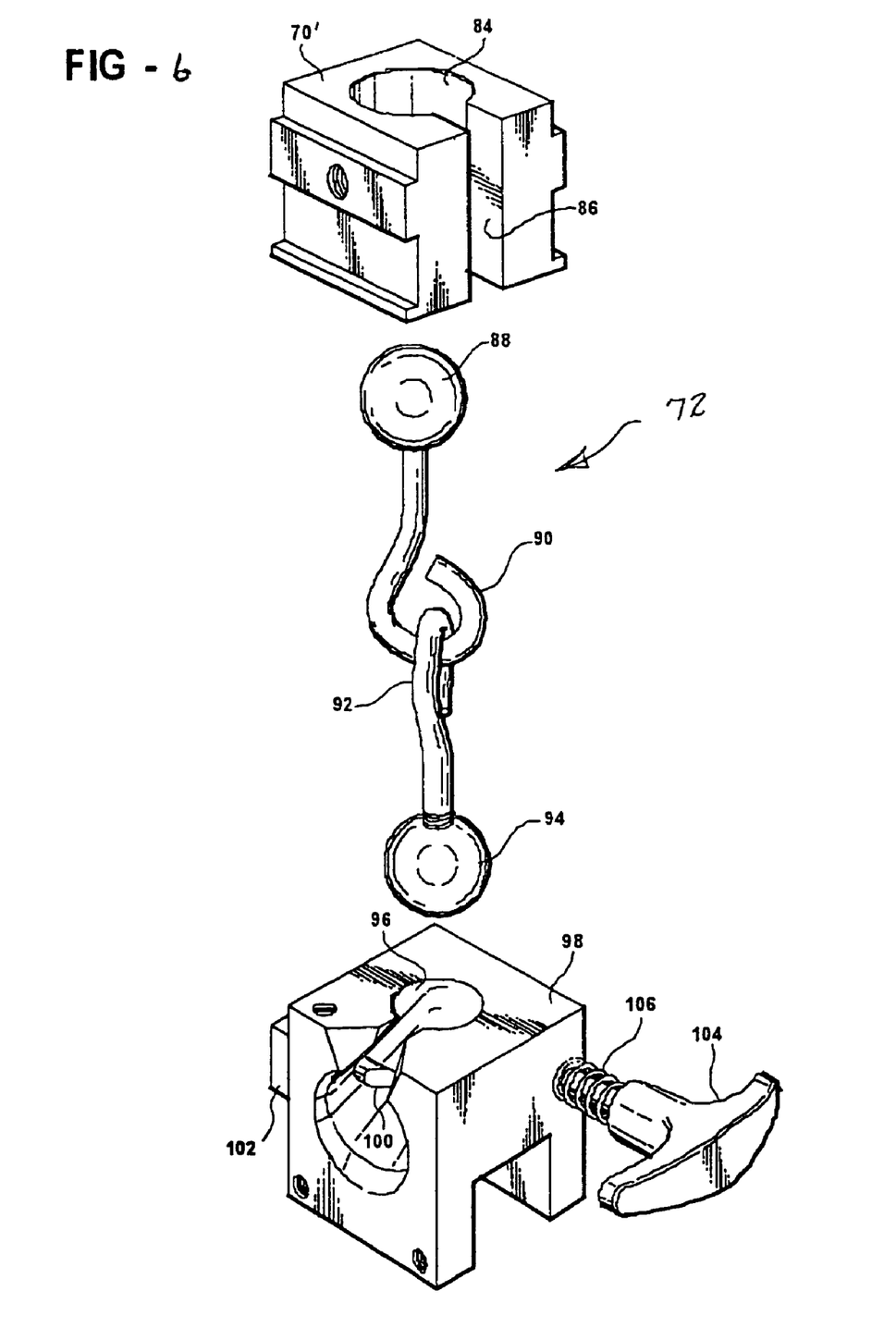
FIG. 6 is a schematic side view of a preferred suspension system for attaching the lift mechanism to a scooter.
Figure 10:
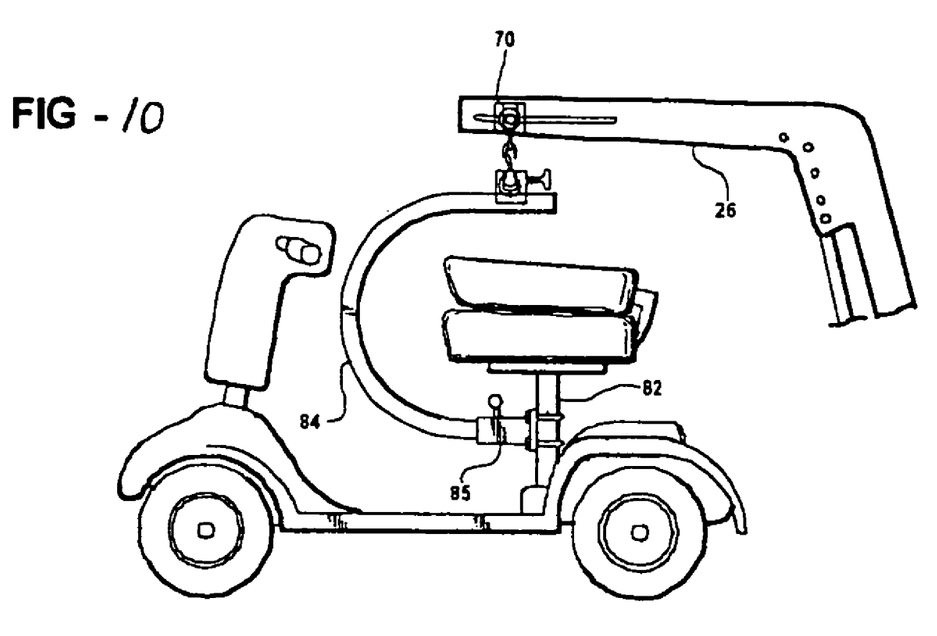
FIG. 10 shows a mechanism for attaching the boom to a scooter by way of suspension components of FIG. 6 and a C-arm.

FIGS. 6 and 10 illustrate a preferred mechanism 12, including a modified slide block 70' for attaching the boom 26 to a tubular steel C-arm 84 which is removably attached by way of a mechanism 85 to the frame of the scooter 82. The attachment mechanism 85 is a conventional socket with a conventional spring-loaded detent to allow the C-arm 84 to be removably attached in preparation for stowage. It is at or near the center of gravity of the scooter 82 for balance purposes as will be apparent to those skilled in the art.

The attachment mechanism is shown to comprise the modified slide block 70', the primary difference between the modified block 70' and the standard block shown in FIG. 5 being the presence of the conical cavity 84 opening to a side slot 86. The cavity 84 receives the upper ball 88 of a two-part linkage comprising an upper eye 90 and a lower eye 92, the lower eye 92 being threaded into a steel swivel ball 94 which provides a spherical bearing as hereinafter described.

The ball 94 fits into a spherical cavity 96 in an aluminum block 98, the interior cavity opening to both the top and side as shown for purposes of admitting the ball 94 to the side opening. A latch pin 100 prevents the ball 94 from exiting through the slide of the block 98 until such time as a release lever 104 is pushed to the left as shown in FIG. 6 against the action of a bias spring 106 to move a plate 102 movably mounted on the back of a block 98. This action pulls the pin 100 out of the cavity and permits the ball 94 to be released.

It will be apparent from the foregoing that the lower block 98 is permanently attached to the C-arm 84 which in turn is temporarily and removably attached to the scooter 82 by means of the spring-loaded detent type attachment mechanism 85. Thereafter, the linear actuator associated with the arm 26 is operated to lower the arm until the length of the linkage 90, 92 is sufficient to collect and attach the scooter 82 to the slide block 70'. At this point, the lift mechanism 10 is operated as described above to lift the scooter 82 above the bumper so that it may be swung into the cargo area of the SUV as described.

Figure 7:
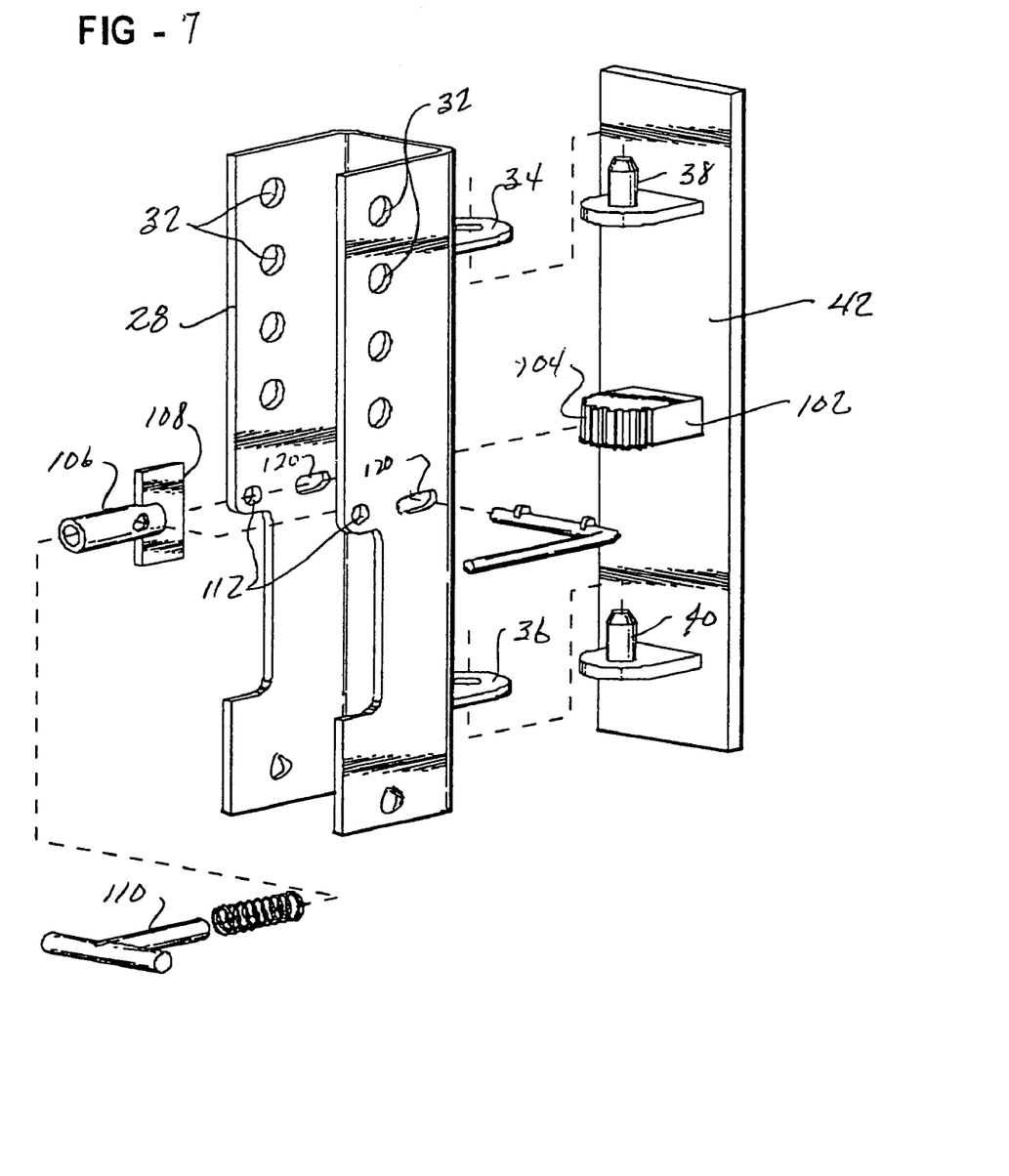
FIG. 7 is an exploded view in perspective of the mast and pintle components, as well as the lock mechanism for releasably locking them in each of several angular relationships.
Figure 8:
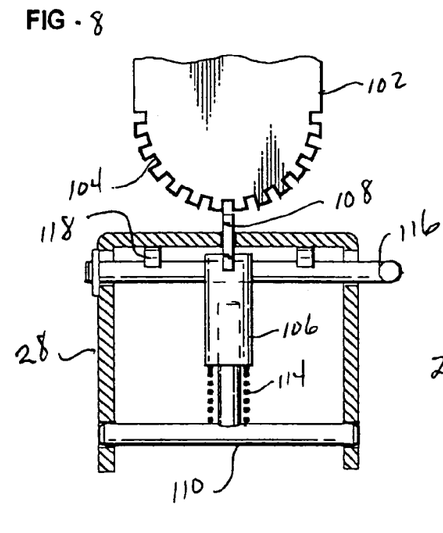
FIGS. 8 and 9 are plan views of the lock mechanism in released and locked conditions, respectively.
Figure 9:
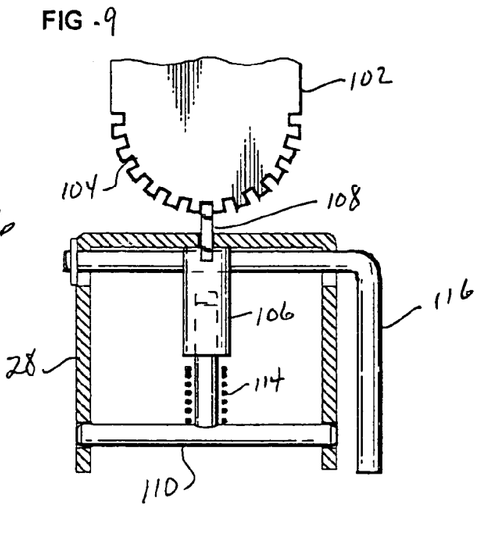

Referring to FIGS. 7, 8 and 9, the mechanism for releasably locking the mast 28 in any of several angular positions about a vertical axis and relative to the pintle plate 42 will be described. The mechanism comprises a steel catch plate 102 having a semicircular end surface with tooth-like vertical slots 105 formed therein. The catch plate 102 is proposed between the brackets holding the pins 38-40 and is securely welded to the face of the pintle plate 42.

The mechanism further comprises a latch, including a hollow cylindrical metal tube attached to a key 108 which fits into the slots 104 in the catch plate 102, as best shown in FIGS. 8 and 9. A T-shaped anchor pin 110 fits between holes 112 and the sides of the mast 28 and extends into the hollow interior of the cylindrical element 106. A spring 114 urges the cylinder 106 and the blade-like key 108 toward the catch plate 102. A latch pin 116, having cam lobes 118 formed thereon is pivotally mounted between slots 120 in the sides of the mast 28 so that rotation of the latch pin 116, between the two positions shown in FIGS. 8 and 9, causes the cam lobes 118 to engage the inside surface of the mast 28, to slide the cylindrical element 106 and blade-type key 108 back along the axis of the T-shaped anchor pin 110, between the released position shown in FIG. 8 and the locked position shown in FIG. 9. It is apparent from these figures that, once the blade key 108 is withdrawn as shown in FIG. 8, the mast 28 can be swung about the vertical axis through the pins 38 to 40 in the desired position. The locking element 106 and blade key 108 can then be released in such a manner that the spring 114 urges them firmly into one of the slots 104 in the desired position. It is highly desirable to lock the mast 28 relative to the pintle plate 42 in either the stowed or deployed positions to prevent inadvertent rotation thereof while the linear actuators are being used and/or the transport vehicle 14 is being driven.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In combination:
   a vehicle having a cargo area with a rear opening having a sill and a closure and a vertically oriented side body structure adjacent the opening but in the cargo area;
   a rigid mounting plate attached to said side body structure proximate the rear opening and rearwardly of the hinge point;
   a lift mechanism pivotally attached to the mounting plate and comprising a vertical mast structure connected to the mounting plate and a substantially L-shaped rigid boom of fixed length having a lower attachment end and an upper free end;
   means pivotally attaching the lower attachment end of the boom to the top of the mounting structure;
   means defining a series of attachment points along the boom substantially midway between the ends thereof;
   said boom being sized and shaped to swing over the sill and partly into the cargo area with the boom in a fully raised position and fully into the cargo area with the top hinged closure in the closed position in at least one angular orientation of the boom relative to the mounting plate which is below said fully raised position;
   said lift mechanism further comprising a powered linear actuator pivotally connected between the bottom of said mounting plate and one of said series of attachment points on said boom such that operating the powered linear actuator varies the angle of the boom relative to the mounting plate in the vehicle thereby to raise and lower the upper free end of the boom; and
   a receiver connected to and depending from the upper free end of the boom to receive a load
   whereby the boom may be lowered by operation of the linear actuator to pick up the load from a grounded position adjacent the rear of the vehicle, raised the load into the air and swing the load by pivotal motion of the boom into the cargo area.

2. The combination defined in claim 1 wherein the linear actuator is a ball-screw actuator having an electric motor.

3. The combination defined in claim 1 further including means for adjustably mounting the attachment device along the upper end of the boom.

4. The combination defined in claim 3 wherein the attachment device comprises a first block attachable to the boom and having a spherical cavity, a second block attachable to a load and having a spherical cavity, and a linkage having a ball at each end which fits into the spherical cavity in one of said first and second blocks, the second block including a release mechanism for locking and releasing a ball in the spherical cavity thereof whereby the load may be detached from this link.

5. The suspension system of claim 4 wherein each of said first and second blocks has a side ball-exit formed therein extending into the spherical cavity thereof.

6. The combination defined in claim 1 wherein the mounting structure includes an elongate pintle plate and the attachment structure includes a mast connected to the lower end of the boom and removably attached to the pintle plate by way of vertical pins and brackets, whereby the pins may be removed and the brackets separated to detach the mast from the pintle plate while leaving the pintle plate attached to the vehicle.

7. A combination as defined in claim 6 including means for selectively locking the mast in any of several angular positions relative to the pintle plate.

8. The combination defined in claim 1 wherein the load receiver comprises a two-part ball and socket connector, one part of said connector being adapted to be fixed to a load.

\* \* \* \* \*